US008499014B2

(12) United States Patent
Miller et al.

(10) Patent No.: US 8,499,014 B2
(45) Date of Patent: Jul. 30, 2013

(54) FUNCTIONALITY DISABLE AND RE-ENABLE FOR PROGRAMMABLE CALCULATORS

(75) Inventors: Michelle A. Miller, Plano, TX (US); Douglas W. Feltz, Plano, TX (US); Gary C. Vonberg, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1188 days.

(21) Appl. No.: 11/142,506

(22) Filed: Jun. 1, 2005

(65) Prior Publication Data

US 2006/0277233 A1    Dec. 7, 2006

(51) Int. Cl.
*G06F 15/02*    (2006.01)

(52) U.S. Cl.
USPC .......................................... 708/130

(58) Field of Classification Search
USPC .......................... 708/130, 200–212
See application file for complete search history.

(56) References Cited

U.S. PATENT DOCUMENTS

| | | | | |
|---|---|---|---|---|
| 3,609,697 | A * | 9/1971 | Blevins et al. | 717/106 |
| 4,139,893 | A * | 2/1979 | Poland | 708/130 |
| 4,262,337 | A * | 4/1981 | Jones | 708/135 |
| 4,398,086 | A * | 8/1983 | Smith, III | 708/105 |
| 4,961,158 | A * | 10/1990 | Sussman | 708/134 |
| 5,262,940 | A * | 11/1993 | Sussman | 705/28 |
| 5,390,296 | A | 2/1995 | Crandall et al. | |
| 5,638,308 | A * | 6/1997 | Stokes | 708/131 |
| 5,978,579 | A * | 11/1999 | Buxton et al. | 717/107 |
| 6,065,122 | A * | 5/2000 | Wunderlich et al. | 713/320 |
| 2002/0032758 | A1 * | 3/2002 | Yen et al. | 709/220 |
| 2005/0152759 | A1 * | 7/2005 | Allemann et al. | 409/181 |
| 2006/0294552 | A1 * | 12/2006 | Swanson et al. | 725/80 |

FOREIGN PATENT DOCUMENTS

| | | |
|---|---|---|
| EP | 0266144 A | 5/1988 |
| WO | 96/19766 A1 | 6/1996 |

OTHER PUBLICATIONS

TI Incoporation, TI TestGuard Quick Reference Guide, Aug. 10, 2001, pp. 1-5, at http://education.ti.com/downloads/guidebooks/apps/83testguard/qrg/qrg_eng.pdf.*

Texas Instruments, TI TestGuard for the Ti-83 Plus, Jul. 20, 2001, pp. 1-41, at http://education.ti.com/downloads/guidebooks/apps/83testguard/ti83testguard-eng.pdf.*

* cited by examiner

*Primary Examiner* — Tan V. Mai
(74) *Attorney, Agent, or Firm* — Mirna Abyad; W. James Brady; Frederick J. Telecky, Jr.

(57) ABSTRACT

A handheld calculator with disable/re-enable capability. The calculator includes a keypad, a display screen, and circuitry internal to the calculator. The circuitry includes a microprocessor, a storage unit for storing data and programs for execution by the microprocessor to implement calculator functions. The storage unit has stored therein a disable/re-enable program that recognizes a first predetermined calculator event and in response thereto disables one or more programs, and that recognizes a second predetermined calculator event and in response thereto re-enables the disabled program. The invention allows Apps, programs and additional information that may be embedded within the Apps and programs in a calculator or other handheld calculating device to be rendered temporarily inaccessible within a relatively short period of time, and then to be restored to the calculator, again, in a relatively short period of time.

20 Claims, 2 Drawing Sheets

FUNCTIONALITY DISABLE AND RE-ENABLE FOR PROGRAMMABLE CALCULATORS

TECHNICAL FIELD OF THE INVENTION

The present invention relates to electronic calculators, and more particularly relates to programmable calculators such as graphing calculators.

BACKGROUND OF THE INVENTION

Solid state electronic calculators appeared during the 1960's as a smaller and quieter alternative to earlier electro-mechanical adding and calculating machines. In 1967, a team of Texas Instruments engineers led by Jack Kilby completed the development of its first prototype integrated circuit electronic calculator, which they called the "Cal-Tech," generally regarded as the world's first "pocket" electronic calculator. It handled the four elementary arithmetic functions, was contained in a small rectangular box, weighed only 45 oz. and used a thermal printer to display results. Texas Instruments was awarded U.S. Pat. No. 3,819,921 on the results of this work.

Development of electronic calculators continued, resulting in ever smaller calculators with ever higher functionality. In 1975 Texas Instruments introduced its first programmable calculator, the SR-52. It had 224 program steps and 20 memory registers, as well as a built-in magnetic card reader. Further improvement to the programmable calculator has led to the development of what has come to be known as the graphing calculator. These handheld calculators combine small size, sophisticated mathematical capability, including the capacity to be programmed with algebraic functions in addition to mathematical operations, and a relatively large display screen, typically comprising a liquid crystal display (LCD), allowing a user to have entered functions be solved and displayed as graphs on the display screen.

The usefulness of handheld graphing calculators in a classroom setting for enhancing the educational experience in both mathematics and science has been widely recognized, and graphing calculators have been used in this way for years. Modern graphing calculators frequently are provided with the capability of being networked together. In today's classroom, such calculators can be networked together along with a teacher's station, which may itself be a graphing calculator, or may be a personal computer.

Such network configurations can greatly enhance the instructional benefits of graphing calculators. In fact, in many states graphing calculators are not only permitted, but are sometimes even required during exit (graduation) exams or end-of-course exams. Using such networked graphing calculators, teachers can teach students algebraic and higher functions which are embedded in hardware and/or firmware programs built into the calculator, software programs stored in the calculator in a BASIC-like language, as well as new software programs, called "Apps" and ASM programs, stored in the calculator, typically in assembly language and entered by the student, or entered by the teacher using the network connection. The knowledge of such functions and the use of the graphing calculator to manipulate them may then be tested during the exam, with the results of the student's work being uploaded to the teacher's station for evaluation and grading.

However, the expanded functionality of handheld programmable calculators which has done so much to enhance the teaching experience in the classroom carries with it a problem, especially in light of the use of such calculators during exams. Exactly because such calculators can be programmed by the student by the storing of Apps and of other information, the student may pre-load an App and/or additional information before an exam that gives the student an unfair advantage over other students. Additionally, a teacher may wish that the students not have available to them during an exam selected programs on the calculator, including Apps, that may have even been stored as part of the teaching experience. Because of this, some states, such as Texas and New York, require that programmable calculators be totally cleared of Apps and additional information prior to an exam in which such calculators are to be used.

Thus it can be seen that the programmable calculator is serving two different environments. One environment is the instructional environment, in which teachers want the students to have access to programs, Apps and other information that may be stored on the calculator, in order to help the student in their learning of math and science topics. The other environment is the testing environment, in which the students are being tested on what they have learned, and therefore may not be allowed to use the programs, Apps and additional information that assisted them with their learning.

It would therefore be desirable for teachers to have students have quick, easy access to programs, Apps and other information in their handheld programmable calculators during instruction, but then not available during exams, but then available again after exams. However, in the handheld calculator art today, the only way to remove programs, Apps and other information in preparation for an exam is to delete them from the calculator altogether. The removal of such items from the calculator takes relatively little time, involving a simple erase operation. However, the restoration of such items requires reloading every such item that was deleted. This can take up to thirty minutes, depending on how many Apps and programs, and how much additional information is being returned to the calculator. This puts a highly undesirable burden on the teacher.

SUMMARY OF THE INVENTION

The present invention allows Apps, programs and additional information that may be embedded within the Apps and programs in a calculator or other handheld calculating device to be rendered temporarily inaccessible within a relatively short period of time, and then to be restored to the calculator, again, in a relatively short period of time. As used herein, the term calculator is to be understood to refer to any handheld calculating device capable of storing programs that are executed on the device, and to computer simulations or emulations of such devices.

In accordance with the invention a handheld calculator is provided with disable/re-enable capability. The calculator includes a keypad, a display screen, and circuitry internal to the calculator. The circuitry includes a microprocessor, a storage unit for storing data and programs for execution by the microprocessor to implement calculator functions. The storage unit has stored therein a disable/re-enable program that recognizes a first predetermined calculator event and in response thereto disables one or more calculator functions, and that recognizes a second predetermined calculator event and in response thereto re-enables the disabled calculator functions.

In this way, Apps and other programs, and other calculator functionality, including functionality which may be embedded in the operating system, as well as data stored therewith may be rendered temporarily inaccessible by a user as quickly as the first predetermined event can be completed. This first predetermined event may be a simple keystroke sequence, such as a 3-key simultaneous key press recognized by the calculator to disable selected programs. Or, the calculator may be provided with a communications port and a communication module for managing communications with other handheld calculators in a network interconnected by way of the communications port, and the first predetermined event may be the sending of a predetermined data set from an application running on a teacher's station, wherein the data set includes a desired configuration of disabled programs for the calculator, recognized and acted on by a corresponding program in the calculator to selectively disable the programs specified in the configuration. The calculator may be programmed to recognize other calculator events to effect the program disabling. Importantly, the programs so disabled are not erased from the calculator storage; they are merely disabled so that they are inaccessible to the user.

The second predetermined calculator event for re-enabling of the disabled programs may be the connecting of any two calculators, or a calculator and the teacher's station, and the sending of a predetermined file or other data to the calculator having its programs re-enabled. The data may be sent by the program on the teacher's station that sent the original data set that caused the programs to be disabled. Or, the data may be sent from another device on the network. The calculator may be programmed to recognize other calculator events to effect the program re-enabling.

These and other aspects and features of the invention will be apparent to those skilled in the art from the following detailed description of the invention, taken together with the accompanying drawings.

DETAILED DESCRIPTION OF THE PREFERRED EMBODIMENT

Figure 1:
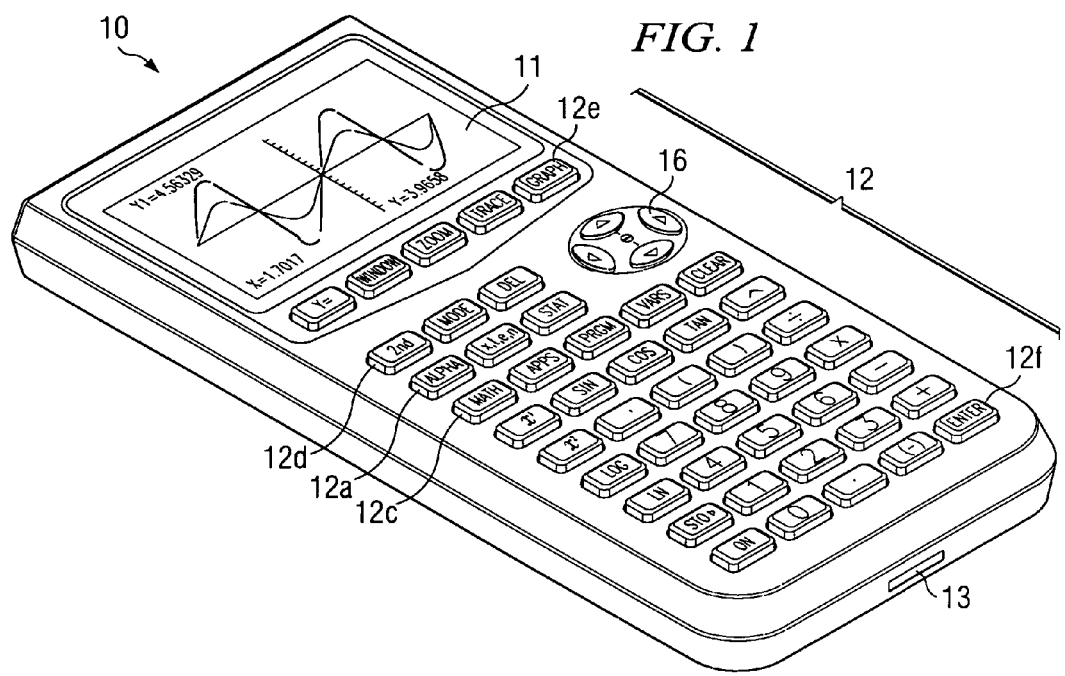
FIG. 1 is an illustration of a programmable graphing calculator used in connection with an embodiment of the invention.

FIG. 1 illustrates the front panel of a programmable calculator 10, which has the disable/re-enable features of the present invention. Calculator 10 is described herein in terms of particular software and hardware features of the TI-83 Plus, a commercially available graphing calculator manufactured by Texas Instruments Incorporated. Apart from the features of the present invention, many of the features of calculator 10 described herein are typical of graphing calculators, while other features are unique to the TI-83 Plus or to its "family" of TI calculators. The use of the TI-83 Plus is for purposes of description, and does not limit the invention. The features that are the subject of the present invention could be incorporated into other calculators that are programmable, or they could be incorporated into other computer-based teaching tools that use simulations or emulations of programmable calculators.

In FIG. 1, the screen 11 of calculator 10 has a "graphical display", as that term is used herein. In addition to the ability to draw graphical displays of various types, some of the software features of calculator 10 include software applications loading and storage, as well as keystroke programming. It also permits data collection, display and analysis.

Figure 2:
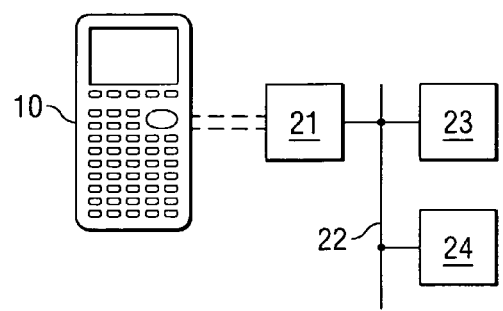
FIG. 2 is a diagram showing selected components internal to the calculator of FIG. 1.

Various hardware features include a large pixel screen 11, which has 64*96 pixels. A keypad 12 has various keys for data and command entry, some of which are used to implement the invention and are described herein. As shown in FIG. 2, internal to calculator 10 are provided a microprocessor 21 which is connected to an internal bus 22. Also connected to bus 22 is a storage unit 23 comprising a flash memory storing an operating system (OS) and other data, as well as RAM, and a unit-to-unit link cable connection module 24 providing the functionality for interconnecting two or more of such calculators into a network. Such functionality includes data and command sending and receiving, and interface management.

Figure 3:
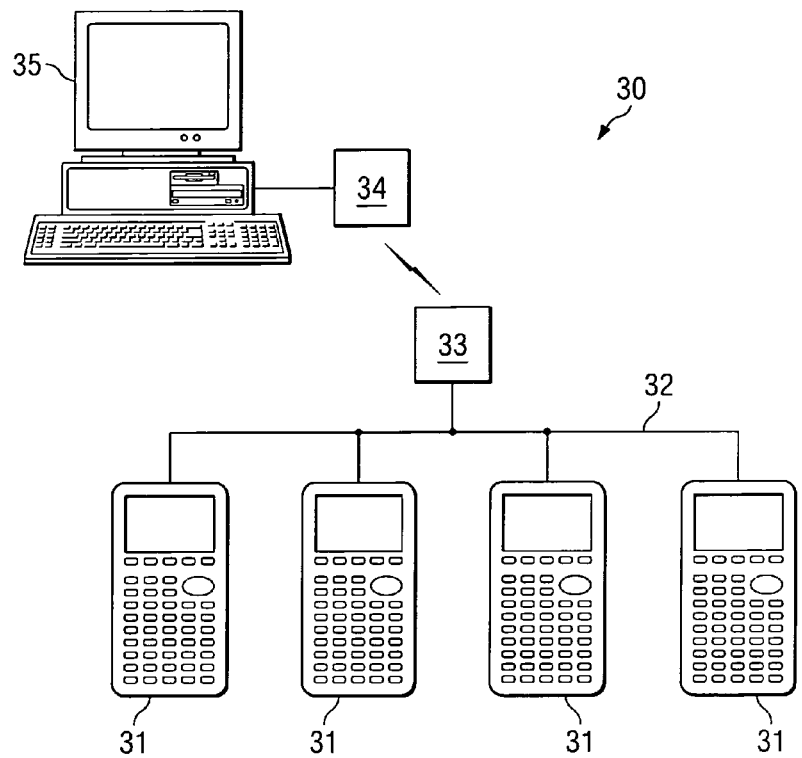
FIG. 3 is a diagram of a representative network of calculators in which a preferred embodiment of the invention is implemented.

Important to the invention, a communications port 13 (FIG. 1) is provided for data linking and networking by way of a cable connected to the port 13. It interfaces internally with the unit-to-unit link cable connection module 24. FIG. 3 shows a typical configuration of a wireless network 30 of programmable calculators 31, for example for use in a classroom setting. Of course, it will be understood that the particular manner of interconnection for the formation of the network is not important to the invention. Cable links and optical fiber links, for example, are all possible. The network 30 shown in FIG. 3 is a TI Navigator™ network, and is a commercially available product. Four calculators 31 are connected by way of cables 32 to a wireless hub 33. The hub 33 communicates by way of radio frequency signals with an access point 34 connected to a PC 35 that comprises the teacher's station.

The network 30 provides a number of useful features for classroom learning. For example, in an "Activity Center," students can contribute in real-time to a shared workspace that can be projected to the class, allowing discussion and collaborative learning. "Screen Capture" allows the teacher to view the screen of an individual student, group, or those of the entire class to see if they are on task. A "Quick Polling" feature collects impromptu feedback from the entire class to check understanding or generate discussion. A "Class Analysis" feature shows student results on assignments, quizzes and tests so the teacher knows right away who understands the material and who needs additional help. Numerous other features are provided.

However, as mentioned above, the same open connectivity, programmability and flexibility of such calculators in such a network presents the problem during exams of having programs and data available to the students that the teacher may not wish them to have during the exam. The embodiment of the invention described herein provides the capability to disable programs and other functionality, including data stored therewith, temporarily, for the duration of an exam for example, and to re-enable them after the exam.

Figure 4:
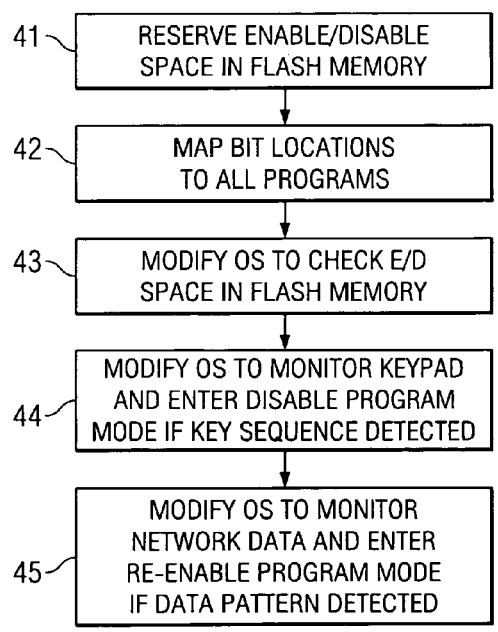
FIG. 4 is a flow chart showing the steps in pre-programming a calculator to implement a preferred embodiment of the invention.

According to this embodiment, the calculator must first be pre-programmed to give the calculator the capability of implementing Disable/Re-enable mode. Pre-programming is explained with reference to FIG. 4. As mentioned above, the calculator 10 includes a storage unit 23 that includes a flash memory. In the first step 41 of pre-programming, a Disable/Re-enable space is reserved in flash memory for this function.

In the next step 42, individual bits in this space are mapped to programs and other functionality the calculator is programmed to execute, such that either: 1) each such program/function (hereinafter, "Program") that is to have the Disable/Re-enable capability has individually mapped to it an associated flag bit in the Disable/Re-enable space in flash memory, or 2) groups of such Programs have mapped to them an associated flag bit in the Disable/Re-enable space in flash memory, or some combination of the two types of flag bit mapping. A flag bit set to 1 indicates that the associated Program is enabled, while a flag bit set to 0 indicates that the associated Program is disabled.

In the third step 43, the OS is modified to check the Disable/Re-enable space in flash memory before running a Program it has been commanded to execute, to determine whether the flag bit mapped to that Program is set to a 1 or a 0. If the associated flag bit is set to a 1, the Program is allowed to execute. If it is set to 0, the Program is not allowed to execute, and an error is generated. This step may be accomplished in a number of ways. For example, the OS may be modified such that when the program display mode is invoked, as it executes a loop looking for all such Programs, as it looks at the next such Program it includes the above-described step of first determining whether the flag bit mapped to that Program is set to a 1 or a 0. If it is set to 1, the Program simply continues to run normally. However, if it is set to 0, the OS skips that Program and loops to find the next. Once all Programs have been dealt with in this way, only those Programs having a flag bit mapped of 1 to it are displayed and are accessible, for example by being executed or edited. The Programs having a flag bit of 0 mapped to them are not displayed and cannot be executed or edited. The OS could still be permitted to show the memory locations of all Programs, for example in a memory display mode, provided the OS in such mode did not permit the user access to the Program other than, perhaps, to erase it. Other embodiments are possible.

In a further step 44, the OS is modified to monitor the keypad 12 for a predetermined key press sequence, and to enter a Disable Program mode if it is detected. In a final step 45, the OS is modified to monitor data received from the teacher's station through the network, and to enter the Re-enable Program mode if a predetermined data pattern is received. Once all of these steps are completed, the calculator is pre-programmed and is capable of implementing the Disable/Re-enable function of the embodiment. The order of the performing of steps 41-45 is not critical, other than that the bit location may only be mapped after the Disable/Re-enable space is reserved, or they may be done in the same operation.

Figure 5:
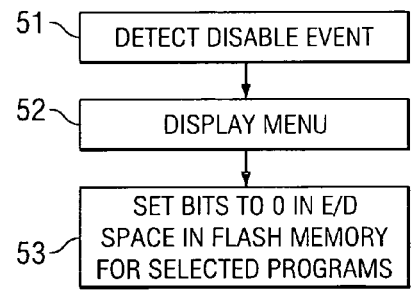
FIG. 5 is a flow chart showing the steps in disabling programs in a calculator in implementing a preferred embodiment of the invention.

The sequence of steps for the Disable Program mode is shown in FIG. 5. The OS monitors the keypad 12 (FIG. 1). The mode is entered 51, as mentioned above, when the OS detects the predetermined key press sequence, for example a 3-key simultaneous key press, such as 2nd key 12*d*—Alpha key 12*a*—Math key 12*c* all pressed at the same time. In the Disable Program mode, the OS initially generates a menu display 52, allowing certain options to be considered by the user. The user is first prompted to decide whether to disable all Programs having the disable capability. If the user enters a "yes," then all flag bits in the Disable/Re-enable space in flash memory are set to a 0, and the calculator exits Disable Program mode. On the other hand, if the user enters a "no," the OS causes the screen 11 to display each Program having this capability individually, and allows the user to select one by one which Programs are to be disabled. Alternatively, the entry of a "no" at this stage could cauls all flag bits to be maintained at "1", indicating no Programs are to be disabled. Once the selections are made and the user presses the Enter key 12*f*, the flag bits in the Disable/Re-enable space in flash memory for the Programs selected to be disabled are set to 0; the other flag bits are maintained at 1. The calculator then exits the mode.

Figure 6:
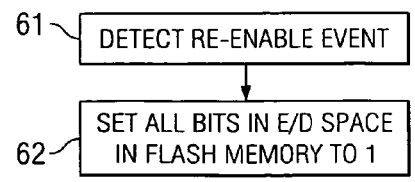
FIG. 6 is a flow chart showing the steps in re-enabling programs in a calculator in implementing a preferred embodiment of the invention.

The sequence of steps for the Re-enable Program mode is shown in FIG. 6. First, a Re-enable event is detected 61. In this embodiment, the Re-enable event is the receipt of the calculator from the teacher's PC through the network of the predetermined data pattern. This data pattern could be any available data pattern that does not conflict with normal data and command communication. The important thing is that the pattern be unique, to avoid conflict with normal calculator operation, and that the calculator be pre-programmed to recognize it as the Re-enable Program mode trigger. In the Re-enable Program mode, all bits in the Disable/Re-enable space in flash memory are simply set to 1, and the calculator exits the mode.

The invention may be implemented in other ways. Of course, the significance of a flag bit being set to a 1 or 0 in the Disable/Re-enable space in flash memory could be reversed. But other mechanisms for disabling the Programs are possible. For example, a set of codes could be stored corresponding to the particular calculator program command, and a comparison made of those codes against the current calculator program command to determine whether to run the Program. However, it is believed that the mechanism described above is most efficient of calculator resources, and is therefore considered preferred. Further, by storing flag bits in flash memory rather than in RAM the states of those bits are not easily changed by the user, enhancing the security of the Program disabling. In addition, resetting the RAM on the calculator does not affect the state of the flash memory, further enhancing security. And, resetting other variables stored in flash also does not affect the status of the Disable/Re-enable flag bits, as they are stored in an area of flash that is reserved for this function and not used to store user data. Also note that in calculators in which, for example, only a limited number of Apps are allowed and each is allocated the same size space in a contiguous portion of flash memory, mapping flag bits to such Programs is relatively simple. However, where Programs are allowed to be of varying size and may be stored in a range of locations, it is necessary to provide a way of relating the flag bit to the Program that takes such variability into account. This can be done by associating a name with the Program, associating the Program start address and size with the name, and mapping the flag bit to the Program by way of its name. The names and associated data could be stored in a table, for example.

In addition, the event that activates Disable Program mode could be the sending of data representing the disabled Program configuration, i.e., identifying which Programs are to be disabled, by the teacher's station, in response to entry of a command to do so by the teacher, through the network to a target calculator. This data could be preceded by a command the calculator is pre-programmed to recognize as a notification that Disable Program configuration data is to follow. The teacher's station can be provided with an application program that sends this command and data using the network. The same application program can be programmed to send, for example in response to entry of a command to do so by the teacher, the data pattern that triggers entering the Re-enable Program mode. Further, the application can be programmed to send configuration data to re-enable only selected ones of the disabled Programs, and the calculator pre-programmed to recognize such configuration data, and to re-enable Programs accordingly.

The calculator can be pre-programmed to trigger re-enabling of Programs upon detection of other events than those described above. For example, Re-enabling could be triggered by the completion of successful communication between any two devices on the network. Such a transfer is a collaborative event that would not normally be expected to occur during an exam when the students are working individually. In addition, the teacher's station can be programmed to monitor network communications during an exam, allowing the teacher to detect attempts to defeat the Program disabling.

The calculator can be pre-programmed to trigger re-enabling of Programs upon detection of a unique password key that can be entered by way of the keypad. The calculator can be pre-programmed to trigger Re-enabling of Programs after the internal clock has indicated a preset duration of time. A counter could be used for this purpose. It may also be pre-programmed to recognize other, external hardware, such as a USB-enabled device that the OS would be programmed to recognize as a trigger mechanism both to disable and re-enable the Programs.

Another way of implementing the invention is to have the application running on the teacher's station transmit over the network to a target calculator an assembly language program that implements the disable/re-enable functionality when run on the target calculator. The application can send the assembly language program at any time, and then, in response to entry of a command to do so by the teacher, send an instruction that causes the program to execute on the target calculator, for example through an Application Program Interface in the target calculator's OS.

Although the present invention and its advantages have been described in detail, it should be understood that various changes, substitutions and alterations can be made herein without departing from the spirit and scope of the invention as defined by the appended claims. For example, the storage unit in which Programs are disabled and re-enabled may be contained within a plug-in unit, instead of being permanently internal to the calculator. Other variations are possible.

What is claimed is:

1. A handheld calculator with disable/re-enable capability, comprising:
    a microprocessor, and
    a storage unit for storing data and programs for execution by the microprocessor to implement calculator functions that relate a calculator program and access to a file in storage; and
    a testing environment disable/re-enable program for entering and exiting a testing environment calculator mode, the disable/re-enable program stored by the storage unit and processed by the microprocessor, wherein the disable/re-enable program recognizes a first predetermined calculator event and in response thereto disables one or more calculator programs, and recognizes a second predetermined calculator event and in response thereto re-enables the disabled one or more calculator programs.

2. A handheld calculator as in claim 1, wherein the first predetermined calculator event comprises the activation of a predetermined key sequence.

3. A handheld calculator as in claim 1, wherein, in response to the first predetermined event the disable/re-enable program selectively disables one or more calculator functions.

4. A handheld calculator as in claim 3, wherein the disable/re-enable program selectively disables calculator functions by:
    setting a flag bit for each such function to a predetermined value in the storage unit; and
    prior to executing a calculator function, determining whether the flag bit for such calculator function has the predetermined value, and if it does, then not executing the function, but if it does not, then executing the function.

5. A handheld calculator as in claim 4, wherein the flag bits are in flash memory in the storage unit.

6. A handheld calculator as in claim 1, wherein the second predetermined calculator event comprises the entry of a predetermined code by way of a keypad.

7. A handheld calculator as in claim 1 further comprising:
    a communications port; and
    a communication module for managing communications with other handheld calculators in a network interconnected by way of the communications port.

8. A handheld calculator as in claim 7, wherein the second predetermined event comprises the receipt of predetermined data from the network.

9. A handheld calculator as in claim 8, wherein a teacher's station is connected to the network, and wherein the predetermined data is sent by the teacher's station.

10. A handheld calculator as in claim 7, wherein a teacher's station is connected to the network, and wherein the teacher's station sends the disable/re-enable program to the calculator by way of the network.

11. A handheld calculator as in claim 1, wherein the disabling and enabling of the calculator functions retains at least one of the program or file in storage and deems the at least one of program or file inaccessible.

12. A handheld calculator with disable/re-enable capability, comprising:
    a microprocessor;
    a non-transitory storage unit for storing data and programs for execution by the microprocessor to implement calculator functions that relate a calculator program and access to a file in storage; and
    a disable/re-enable program for selecting one or more calculator programs relating to functions available to display on a calculator display and executed by the microprocessor during an exam, wherein the disable/re-enable program stored by the non-transitory storage unit and processed by the microprocessor and wherein the one or more disabled calculator programs are at least one of unavailable to be selected from a calculator display and are disabled from being executed by the microprocessor.

13. A handheld calculator as in claim 12, wherein the disable/re-enable program for selecting calculator functions is displayed by pressing a predetermined key sequence.

14. A handheld calculator as in claim 12, wherein the disable/re-enable program for selecting calculator functions is non-responsive when calculator functions are disabled.

15. A handheld calculator as in claim 12, wherein the disable/re-enable program for selecting calculator functions is protected by a predetermined code by way of a keypad.

16. A handheld calculator as in claim 12 further comprising:
    a communications port; and
    a communication module for managing communications with other handheld calculators in a network interconnected by way of the communications port.

17. A handheld calculator as in claim 16, wherein the second predetermined event comprises the receipt of predetermined data from the network.

18. A handheld calculator as in claim 17, wherein the disable/re-enable program selectively disables calculator functions by:

setting a flag bit for each such function to a predetermined value in the storage unit; and prior to executing a calculator function, determining whether the flag bit for such calculator function has the predetermined value, and if it does, then not executing the function, but if it does not, then executing the function.

19. A handheld calculator as in claim 18, wherein the flag bits are in flash memory in the storage unit.

20. A handheld calculator as in claim 17, wherein a teacher's station is connected to the network, and wherein the predetermined data is sent by the teacher's station.

\* \* \* \* \*